United States Patent
Shiung

(10) Patent No.: US 7,026,864 B2
(45) Date of Patent: Apr. 11, 2006

(54) NON-COHERENT FSK DEMODULATOR

(75) Inventor: David Shiung, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 39 days.

(21) Appl. No.: 10/777,910

(22) Filed: Feb. 11, 2004

(65) Prior Publication Data
US 2005/0012544 A1 Jan. 20, 2005

(30) Foreign Application Priority Data
Jul. 14, 2003 (TW) .............................. 92119107 A

(51) Int. Cl.
*H03D 3/00* (2006.01)
(52) U.S. Cl. ............... 329/300; 329/303; 329/315; 375/303; 375/334; 375/340
(58) Field of Classification Search ............... 329/300, 329/303, 315; 375/303, 334, 340
See application file for complete search history.

(56) References Cited

U.S. PATENT DOCUMENTS 4,574,247 A * 3/1986 Jacob ..................... 329/300
5,732,110 A * 3/1998 Richards ................ 375/334

\* cited by examiner

*Primary Examiner*—Arnold Kinkead
(74) *Attorney, Agent, or Firm*—J.C. Patents

(57) ABSTRACT

A non-coherent frequency shift key demodulator comprising an oversampling device, a chain of registers, and a threshold device is disclosed. The oversampling device receives an input digital non-coherent frequency shift signal, and examines for transitions therein, and thereby generating data bit signals in the form of logic high level '1' or logic low level '0' accordingly. The chain of registers receives, counts and stores the number of 1's data bit signals. Following, the threshold device compares the stored number of 1's in the chain of registers with a predetermined threshold value to extract the digital signal of the input digital non-coherent frequency shift signal. The non-coherent frequency shift key demodulator, by the use of a simple circuit and implementation, combats miscellaneous system impairments, such as frequency offset, and further support multi-rate transmission.

6 Claims, 2 Drawing Sheets

NON-COHERENT FSK DEMODULATOR

CROSS-REFERENCE TO RELATED APPLICATION

This application claims the priority benefit of Taiwan application serial no. 92119107, filed Jul. 14, 2003.

BACKGROUND OF THE INVENTION

1. Field of the Invention

The present invention relates to a demodulator for communication system. More particularly, the present invention relates to a non-coherent Frequency Shift Key (non-coherent FSK) demodulating circuit and method.

2. Description of Related Art

It is well known in wireless communication systems that in order to transmit information, one must modulate a sine wave with the information therewith. A way to modulate a sine wave includes frequency modulation (FM), which is most commonly used in FM radio, as well as other wireless devices such as pagers, cellular phones, cordless telephones etc. Among the various forms of frequency modulation used for data communications includes the frequency shift key (FSK) modulation. In FSK modulation, digital binary data is encoded through the modulation between two frequencies $f_1$ and $f_0$, known as mark (representing logic high level '1'), and space (representing logic low level '0'), and then transmitted therewith. The FSK modulated waveform is transmitted by a transmitter and received by a receiver whereby the transmitted FSK signal is demodulated and the digital binary data is restored.

FIG. 1, shows a block diagram of a conventional FSK receiver. The FSK receiver 100 includes a receiving antenna 110, a low noise amplifier (LNA) 120, a mixer 130, a low-pass filter 140, an analog-to-digital converter 150 and a demodulator 160. The antenna 110 receives a Radio Frequency (RF) signal transmitted by a transmitter. The RF signal is amplified by the low noise amplifier 120 and then is mixed with a local oscillating (LO) signal $f_c$ with a LO frequency by the mixer 130. Following, the low pass filter 140 gets rid of distortions from mixing the RF signal in the digital data-bearing signal. The filtered mixed RF signal is then sampled by the analog-to-digital converter 150, thereby a digital non-coherent frequency shift key signal DNFSK is obtained. The digital non-coherent frequency shift key signal DNFSK having the first frequency $f_1$ or the second frequency $f_0$ will be further demodulated by the demodulator 160 to obtain the digital signal transmitted by the transmitter modulated in the RF signal.

Currently, there are at least two kinds of demodulator 160 being applied in the FSK receiver 100 as shown in FIG. 2 and FIG. 3 respectively. Referring to FIG. 2, the block diagram shows a conventional demodulator using a correlation receiver. Whereas FIG. 3, shows the block diagram of a conventional demodulator using a discrimination detector.

In FIG. 2, the demodulator 160 includes a first correlator 210, a second correlator 220 and a comparator 230. An integral circuit is respectively used in the first correlator 210 and the second correlator 220 for calculating a correlation value of the digital non-coherent frequency shift key signal DNFSK, which has the first frequency $f_1$ or the second frequency $f_0$, respectively, representing logic high level or logic low level. The comparator 230 compares the correlation values that are output from the first correlator 210 and the second correlator 220, in order to obtain the digital signal D from the RF signal.

Referring to FIG. 3, the demodulator 160 includes a discriminator 310 and a decision logic 320. A differential circuit is used in the discriminator 310 for calculating the digital non-coherent frequency shift key signal DNFSK, which has the first frequency $f_1$ or the second frequency $f_0$, in time domain to obtain a differential value. The differential value is proportional to the first frequency $f_1$ and the second frequency $f_0$. The decision logic 320 thus obtains the digital signal D in the RF signal by judging the differential value that is output from the discriminator 310.

It is obvious that the conventional demodulator 160 requires a complicated circuit for calculating and obtaining the digital signal, as exemplified by the integral circuit in the demodulator of FIG. 2 or the differential circuit in the demodulator of FIG. 3. Therefore, there is a need of a simpler architecture and implementation compared to the above stated conventional demodulators.

SUMMARY OF THE INVENTION

Accordingly, one of the objects of the present invention is to provide a non-coherent frequency shift key demodulator which is implemented by a neat and simple circuit as required, comparing to the conventional correlation receiver or the conventional discrimination detector, for exact extraction of information that is conveyed in the incoming carrier frequency.

One of the objects of the present invention is to provide a non-coherent frequency shift key demodulator that is robust in combating miscellaneous system deficiency, such as frequency offset, by using a simple look-up table that records the corresponding entities. The non-coherent frequency shift key demodulator disclosed further provides a much larger tolerance to frequency offset caused by crystal frequency variation, which is superior to the conventional correlation receiver or the conventional discrimination detector.

Another purpose of the present invention is to provide a non-coherent frequency shift key demodulator that supports multi-rate transmission which is superior to the conventional correlation receiver.

For the achievement of the purposes above stated, the invention provides a non-coherent frequency shift key demodulator, which at least includes an oversampling device, a chain of registers and a threshold device. The oversampling device is used for receiving a digital non-coherent frequency shift key (DNFSK) signal with a digital signal conveyed therein and examining for transitions within the DNFSK signal. Moreover, upon examining transitions, the oversampling device outputs corresponding data bit signal either logic high level '1' or logic low level '0' according to whether a transition exists or not. The chain of registers, coupled to the oversampling device, receives the data bit signals, counts and stores the number of logic high level '1' received, and outputs a number-of-ones value signal. The threshold device, coupled to the chain of registers, receives and compares the number-of-ones value signal with a predetermined threshold value to determine the digital signal carried in the DNFSK signal.

In an alternative embodiment, if the DNFSK signal has a first frequency $f_1$ or a second frequency $f_0$, respectively representing a logic high level and a logic low level, and a system data rate R, where the predetermined threshold value THR is determined as $(f_1+f_0)/R$.

In an alternative embodiment, a logic low level digital signal is determined if the number-of-ones value signal is smaller than the threshold value THR, and a logic high level digital signal is determined if the number-of-ones value signal is larger than the threshold value.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
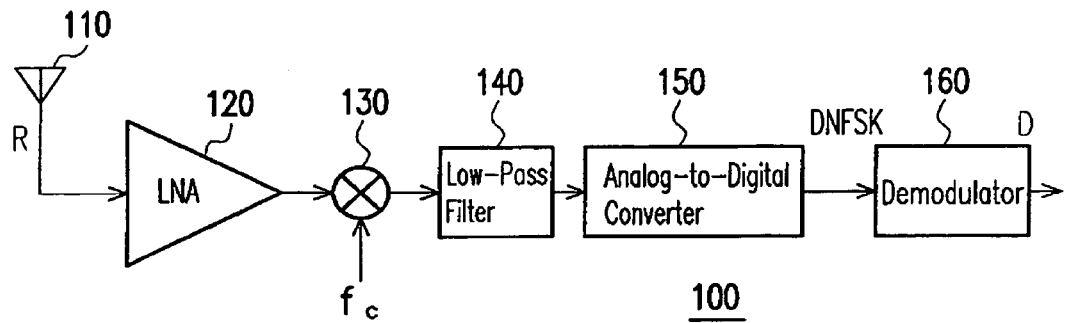
FIG. 1 shows a block diagram of a conventional FSK receiver.
Figure 2:
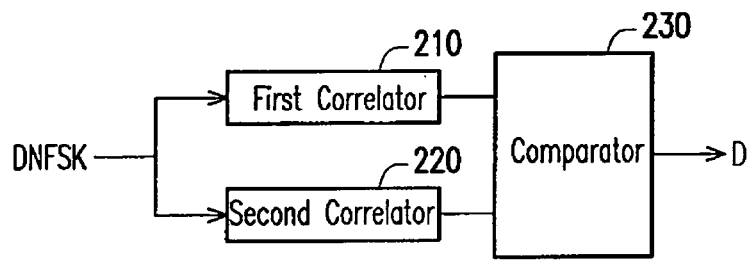
FIG. 2 shows a block diagram of a conventional demodulator using correlation receivers.
Figure 3:
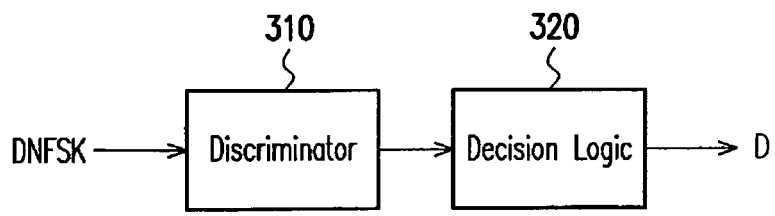
FIG. 3 shows a block diagram of a conventional demodulator including a discrimination detector.

Reference will now be made in detail to the present preferred embodiments of the invention, examples of which are illustrated in the accompanying drawings. Wherever possible, the same reference numbers are used in the drawings and the description to refer to the same or like parts.

Figure 4:
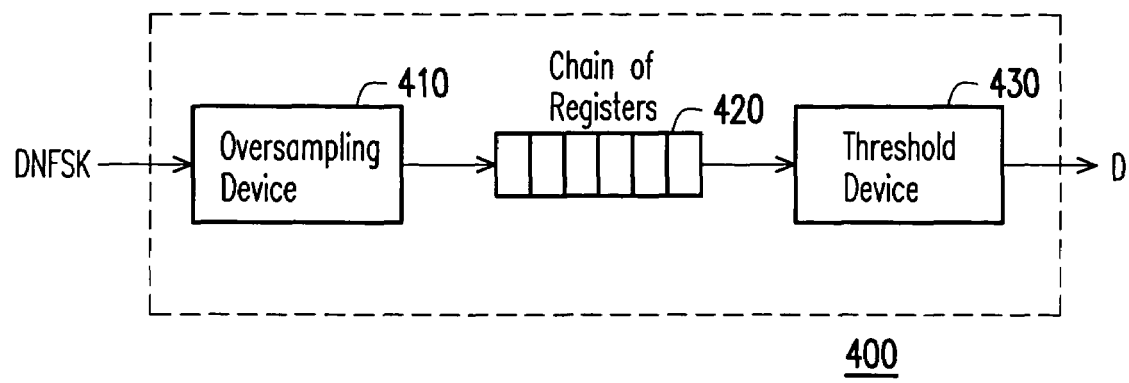
FIG. 4 shows a block diagram of a non-coherent frequency shift key (FSK) demodulator of one preferred embodiment of the present invention.

FIG. 4, shows a block diagram of a non-coherent frequency shift key (FSK) demodulator of a preferred embodiment of the present invention. The received radio-frequency (RF) signal is first down-converted to a digital non-coherent frequency shift key signal DNFSK having a first frequency $f_1$ or a second frequency $f_0$, representing a logic high level '1' or a logic low level '0', respectively. The digital non-coherent frequency shift key signal DNFSK can be obtained, for instance, by the use of an analog-to-digital converter 150 as shown in FIG. 1, which is then received by the non-coherent FSK demodulator 400. Therefore, a digital signal D transmitted from a transmitter (not shown) conveyed in the received digital non-coherent frequency shift key signal DNFSK can be extracted by the non-coherent FSK demodulator 400. In order to clearly explain the invention, in the following description, it is assumed that if the digital signal D is a logic high signal representing "1", the frequency of the digital frequency shift key signal is the first frequency $f_1$, and if the digital signal D is a logic low signal representing "0", the frequency of the digital frequency shift key signal is the second frequency $f_0$.

Referring to FIG. 4, the non-coherent FSK demodulator 400 comprises at least an oversampling device 410, a chain of registers 420, and a threshold device 430. The oversampling device 410 receives an input digital non-coherent frequency shift key signal DNFSK, and outputs data bit signals accordingly. The chain of registers 420, coupled to the oversampling device 410, receives each data bit signal, and outputs a number-of-ones value signal. The threshold device 430, coupled to the chain of registers 420, receives and compares the number-of-ones value signal with a threshold value THR, and outputs the digital signal conveyed in the input digital non-coherent frequency shift key signal DNFSK. The operation method of the preferred embodiment is explained in more detail below accompanying with the waveform diagram respectively shown in FIG. 5, as followed.

Say that the oversampling device 410 receives an input digital non-coherent frequency shift key signal DNFSK conveying the digital signal message "1001110111" in a FSK modulated form. The oversampling device 410 receives and examines transitions within the input digital frequency shift key signal DNFSK, and outputs a data bit signal in the form of '1' for every transition found, or a '0' for every transition not found accordingly, thus generating data bit signals composed of '1's and '0's. The chain of registers 420, coupled to the oversampling device 410, receives each data bit signal (or the data bit signals composed of '1's and '0'), counts and stores the number of '1's received, and outputs a number-of-ones value signal. The threshold device 430, coupled to the chain of registers 420, receives and compares the number-of-ones value signal with a threshold value THR predetermined in the threshold device 430 and the digital signal D is then demodulated thereby.

If the input digital non-coherent frequency shift key signal DFSK has a first frequency $f_1$ or a second frequency $f_0$, respectively representing a logic high level and a logic low level, and a system data rate R, the predetermined threshold value THR can be determined as $(f_1+f_0)/R$. For example, if the digital signal is in a status of the logic high level representing '1', the frequency of the input digital non-coherent frequency shift key signal DNFSK is 14 kHz. Furthermore, if the digital signal is in a status of the logic low level representing '0', the frequency of the input digital non-coherent frequency shift signal DNFSK is 6 kHz. In addition, if the system data rate R is equal to 0.5 kHz, then the predetermined threshold value THR can be set as (14 kHz+6 kHz)/0.5 kHz=40. In this manner, if the number of 1's, i.e. number-of-ones value signal exceeds the threshold value THR, then the threshold device 430 issues an output logic high level '1'. Otherwise, the threshold device 430 issues an output logic low level '0', thereby obtaining the digital signal from the incoming digital non-coherent frequency shift key signal DNFSK.

Figure 5:
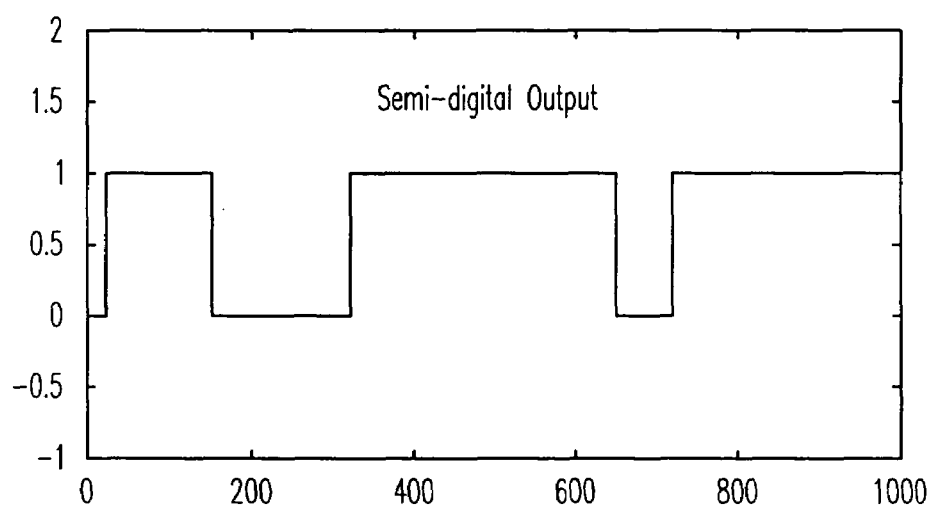
FIG. 5 shows the rectangular pulses demodulated by the non-coherent frequency shift key demodulator of the preferred embodiment of the present invention if the digital data stream is "1001110111" is carried in a FSK signal.

FIG. 5 shows the output rectangular pulse generated by the non-coherent FSK demodulator 400 of the preferred embodiment of the present invention, if the transmitted digital data bit stream is '1001110111'. Further note in FIG. 5 that each bit is 100 units on the abscissa for illustration purposes. It is apparent that simple circuitry is required for exact demodulation of the digital signal conveyed in the input digital non-coherent frequency shift key signal by applying the non-coherent FSK demodulator of the present invention with a significant high frequency offset.

Accordingly, the non-coherent frequency shift key demodulator of the preferred embodiment is implemented by a neat and simple logic circuit, as compared to the conventional correlation receiver or the conventional discrimination detector, for exactly extracting information conveyed in the incoming signals. The non-coherent frequency shift key demodulator is also robust in combating miscellaneous system defects, such as frequency offset caused by crystal frequency variation, by using a simple look-up table that records the corresponding entities. The non-coherent FSK demodulator has a much larger tolerance to frequency offset, as compared to the conventional correlation receiver or the conventional discrimination detector. In addition, the non-coherent FSK demodulator further supports multi-rate transmissions with simply implemented circuit as compared to the conventional correlation receiver.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A non-coherent frequency shift key demodulating circuit, comprising:
   an oversampling device, for receiving and examining an input digital non-coherent frequency shift key signal carrying a digital signal upon existence of transition, and further outputting a data bit signal recording whether a transition exists or not;
   a chain of registers, coupled to the oversampling device, receiving the data bit signal, and further counting and storing a quantity of logic high level status of the data bit signal received, and outputs a number-of-ones value signal correspondingly;
   a threshold device, coupled to the chain of registers, for receiving and comparing the number-of-ones value signal with a predetermined threshold value to determine the digital signal carried in the input digital non-coherent frequency shift key signal, wherein if the digital frequency shift key signal has a first frequency and a second frequency respectively representing a logic high level and a logic low level, the predetermined threshold value is determined as a quotient of a system data rate dividing a sum of the first frequency and the second frequency.

2. The non-coherent frequency shift key demodulating circuit of claim 1, wherein the data bit signal is logic high level if a transition of the input digital non-coherent frequency shift key signal exists, and the data bit signal is logic low level if no transition of the incoming input digital non-coherent frequency shift key signal exists.

3. The non-coherent frequency shift key demodulating circuit of claim 1, wherein the digital signal is determined a low level digital signal if a number-of-ones value signal is smaller than the predetermined threshold value, and the digital signal is determined a high level digital signal if the number-of-ones value signal is higher than the predetermined threshold value.

4. A non-coherent frequency shift key demodulating method, comprises:
   receiving and examining an input digital non-coherent frequency shift key signal carrying a digital signal upon existence of transition, and further outputting a data bit signal recording whether a transition exists or not;
   receiving the data bit signal, and further counting and storing a quantity of logic high level status of the data bit signal received, and outputs a number-of-ones value signal correspondingly,
   wherein if the digital frequency shift key signal has a first frequency and a second frequency respectively representing a logic high level and a logic low level, a predetermined threshold value is determined as a quotient of a system data rate dividing a sum of the first frequency and the second frequency.

5. The non-coherent frequency shift key demodulating method as recited in claim 4, wherein the data bit signal is logic high level if a transition of the input digital non-coherent frequency shift key signal exists, and the data bit signal is logic low level if no transition of the incoming input digital non-coherent frequency shift key signal exists.

6. The non-coherent frequency shift key demodulating method as recited in claim 4, wherein the digital signal is determined a low level digital signal if a number-of-ones value signal is smaller than the predetermined threshold value, and the digital signal is determined a high level digital signal if the number-of-ones value signal is higher than the predetermined threshold value.

* * * * *